US011137945B1

(12) United States Patent
Vankamamidi et al.

(10) Patent No.: US 11,137,945 B1
(45) Date of Patent: Oct. 5, 2021

(54) RECOVERY OF LAST ALLOCATED LOGICAL BLOCK ADDRESS

(71) Applicant: EMC IP Holding Company LLC, Hopkinton, MA (US)

(72) Inventors: Vamsi K. Vankamamidi, Hopkinton, MA (US); Philippe Armangau, Acton, MA (US); Ashok Tamilarasan, Shrewsbury, MA (US); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/844,076

(22) Filed: Apr. 9, 2020

(51) Int. Cl.
*G06F 3/00* (2006.01)
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/0631* (2013.01); *G06F 3/0689* (2013.01); *G06F 12/10* (2013.01); *G06F 2212/1044* (2013.01)

(58) Field of Classification Search
None
See application file for complete search history.

(56) References Cited

U.S. PATENT DOCUMENTS

| 10,289,336 | B1* | 5/2019 | Liu .................. G06F 3/0616 |
| 2002/0087673 | A1* | 7/2002 | Selkirk .............. G06F 11/1076 709/223 |
| 2015/0089282 | A1* | 3/2015 | Taranta, II ......... G06F 11/1076 714/6.24 |

* cited by examiner

Primary Examiner — Craig S Goldschmidt
(74) Attorney, Agent, or Firm — BainwoodHuang

(57) ABSTRACT

A logical unit of non-volatile data storage is provided for persistently storing metadata. The logical unit is provided by allocating RAID (Redundant Array of Independent Disks) extents to the logical unit, and allocating logical block addresses for the logical unit from within a logical address space of the logical unit to store blocks of metadata written to the logical unit. In response to detecting that a stored indication of a last allocated logical block address for the logical unit has been lost, two RAID extents that were last allocated to the logical unit are identified, and a binary search is performed across logical block addresses within the two RAID extents that were last allocated to the logical unit to locate the last allocated logical block address for the logical unit within the logical address space of the logical unit.

13 Claims, 7 Drawing Sheets

RECOVERY OF LAST ALLOCATED LOGICAL BLOCK ADDRESS

TECHNICAL FIELD

The present disclosure relates generally to intelligent data storage systems that provide mapped RAID (Redundant Array of Independent Disks) data protection, and more specifically to technology for recovering the logical block address that was last allocated from within a logical address space of a logical unit of non-volatile storage used to persistently store metadata written to the logical unit by one or more processes executing in a data storage system.

BACKGROUND

Data storage systems are arrangements of hardware and software that may include one or more storage processors coupled to non-volatile data storage drives, such as solid state drives and/or magnetic disk drives. Each storage processor may service host I/O requests received from physical and/or virtual host machines ("hosts"). The host I/O requests received by the storage processor may specify one or more storage objects (e.g. logical units or "LUNs" and/or files) that are hosted by the storage system and store user data that is written and/or read by the hosts. Each storage processor executes software that processes host I/O requests and performs various data processing tasks to organize and secure the user data that is received from the hosts and stored in the non-volatile data storage drives of the data storage system.

While processing host I/O requests that read and write the user data stored in the non-volatile data storage of the data storage system, one or more processes executing within the data storage system generate metadata that also needs to be persistently stored in the non-volatile data storage of the data storage system. In order to allow such internal processes to persistently store the metadata that they generate, the storage processor may also provide one or more logical units of non-volatile data storage that are used to persistently store the internally generated metadata in the non-volatile data storage drives of the data storage system.

SUMMARY

A data storage system may include RAID (Redundant Array of Independent Disks) technology. Traditional RAID is a data storage virtualization/protection technology that combines multiple physical drives into a single logical unit to provide data redundancy and/or performance improvement. Data may be distributed across the drives using one of several RAID technologies, referred to as RAID levels, depending on the desired levels of redundancy and performance. Some RAID levels employ data striping ("striping"). In general, striping involves segmenting received host data into logically sequential blocks (e.g. sequential blocks in a logical address space of a logical unit), and then storing data written to consecutive blocks in the logical sequence of blocks onto different drives. A series of consecutive, logically sequential data blocks that are stored across different drives is referred to as a RAID "stripe". By spreading data segments across multiple drives that can be accessed concurrently, total data throughput can be increased.

Some RAID levels employ a "parity" error protection scheme to provide fault tolerance. When parity protection is used, one or more additional parity blocks are maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block.

One example of a RAID level that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. A spare disk may also be kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID levels may provide a higher level of data protection, e.g. data protection even in the event that multiple disks fail concurrently. For example, 4D+2P RAID-6 provides striping with double distributed parity information that is provided on a per-stripe basis. The double parity information maintained by 4D+2P RAID-6 enables data protection for up to a maximum of two concurrently failing drives.

A data storage system may use mapped RAID technology to avoid technical limitations of traditional RAID, including limitations of traditional RAID with regard to the ability to conveniently add new drives. Specifically, traditional RAID systems have not supported the addition of new drives on an individual disk basis, but have instead required that new storage capacity be added only in increments equal to the number of drives that is required to support the specific RAID configuration, i.e. equal to the width of the RAID stripe being used. Accordingly, for 4D+1P RAID-5 level technology, new drives can only be added to a traditional RAID system in increments of five drives at a time. For 4D+2P RAID-6 technology, new drives can only be added to traditional RAID systems in increments of six drives. As the capacity of individual drives has increased over time with the introduction of new storage technologies, the inflexibility of traditional RAID systems with regard to adding new capacity has become increasingly burdensome and impractical.

Mapped RAID technology improves on traditional RAID technology by allowing for the addition of individual storage drives to a RAID protected data storage system in order to conveniently increase storage capacity. In mapped RAID technology, each physical data storage drive is divided into multiple contiguous regions of physical non-volatile data storage referred to as "drive extents". Discrete sets of drive extents are mapped by RAID logic to corresponding logical "RAID extents". The number of drive extents mapped to each RAID extent is the same as the number of disks used in a traditional RAID system to store data blocks and parity information for the same RAID level that is provided by the RAID extent. Data structures such as one or more RAID mapping tables are used by RAID logic to associate each set of drive extents with its corresponding RAID extents. Multiple RAID extents may be provided as logically contiguous address regions contained within a larger logical address space of a logical unit to which the RAID extents are allocated. I/O operations directed to the logical unit may indicate logical block addresses (LBAs) within the logical address space. Each logical block address is mapped (e.g. by mapping logic and/or RAID logic in the storage processor) to a specific RAID extent within the logical address space of the logical unit, to a specific logical block within that RAID extent, and to corresponding physical locations of non-volatile data storage within the set of drive extents that are allocated to that RAID extent. In order for mapped RAID to operate correctly, each drive extent with the set of drive extents allocated to an individual RAID extent must be located on a different physical data storage drive.

Each RAID extent may independently provide a corresponding level of RAID protection. Different RAID extents in the logical address space of a logical unit may each provide the same, or different levels of RAID protection. The set of drive extents allocated to an individual RAID extent stores blocks of data and parity information in stripes that are defined by the specific RAID level corresponding to the RAID extent. For example, each RAID extent providing 4D+1P RAID-5 protection is allocated five drive extents in order to store the four blocks of data and one block of parity information contained in each stripe defined by 4D+1P RAID-5 across different drive extents. In another example, each RAID extent providing 4D+2P RAID-6 level RAID protection is allocated five drive extents in order to store the four blocks of data and two blocks of parity information in each stripe defined by 4D+2P RAID-6 across different drive extents.

For a logical unit that is used by a storage processor to persistently store internally generated metadata of the storage processor, as the total amount of metadata that is written to the logical unit increases, additional RAID extents may be allocated to the logical unit. As specific blocks of metadata are written to the logical unit by metadata-generating processes executing in the storage processor, logical block addresses may be allocated from within the logical address space of the logical unit to store the blocks of metadata. The last allocated logical block address for the logical unit is the highest logical block address that has been allocated from within the logical address space of the logical unit to store metadata written to the logical unit. The storage processor needs to persistently maintain the last allocated logical block address for a logical unit that stores metadata to process host I/O requests. When new metadata is generated during the processing of host I/O requests and written to the logical unit for persistent storage, the storage processor needs to retrieve the last allocated logical block address for the logical unit in order to determine where to start allocating new logical block addresses to be used to store the newly received metadata within the logical address space of the logical unit. If the saved copy of the last allocated logical block address for the logical unit becomes unavailable (e.g. is corrupted due to a hardware failure, software bug, etc.), the storage processor must quickly recover the last allocated logical block address in order to provide seamless continued processing of host I/O requests. The last allocated logical block address for the logical unit must be recovered without significant delays, in order to avoid significant performance problems such as increased latency in servicing host I/O requests, and/or interruption of a storage service provided by the data storage system to the hosts. Previous data storage systems have maintained multiple (e.g. mirrored) copies of the last allocated logical block address for the logical unit used to store metadata generated within the storage processor. However, even in the case where multiple copies of the last allocated logical block address for the logical unit are stored, under some circumstances the stored copies may all become corrupted due to hardware failures and/or software bugs. Recovery of the last allocated logical block address for the logical unit storing metadata using previous technology could require time consuming and resource intensive procedures, potentially involving linear scanning of large numbers of logical block addresses within the logical address space of the logical unit to identify the last allocated logical block address. As the total number of allocated logical block addresses becomes very large, such previous approaches to recovering a lost last allocated logical block address for a logical unit storing metadata becomes increasingly undesirable.

The disclosed technology addresses the above described and other shortcomings of previous technologies. In the disclosed technology, a logical unit of non-volatile data storage is provided for persistently storing metadata. The logical unit is provided by allocating RAID (Redundant Array of Independent Disks) extents to the logical unit, and allocating logical block addresses for the logical unit from within a logical address space of the logical unit to store blocks of metadata written to the logical unit. In response to detecting that a stored indication of the last allocated logical block address for the logical unit has been lost, the disclosed technology determines two RAID extents that were last allocated to the logical unit, and performs a binary search across logical block addresses within the two RAID extents that were last allocated to the logical unit to locate the last allocated logical block address for the logical unit within the logical address space of the logical unit.

In some embodiments, the two RAID extents that were last allocated to the logical unit are made up of a second to last RAID extent allocated to the logical unit and a last RAID extent allocated to the logical unit. Performing the binary search across the logical block addresses within the two RAID extents that were last allocated to the logical unit may include initially setting a lower bound to a lowest logical block address within the second to last RAID extent allocated to the logical unit, initially setting an upper bound to a highest logical block address within the last RAID extent allocated to the logical unit, and performing the binary search on logical block addresses across a range of logical block addresses extending from the lower bound to the upper bound.

In some embodiments, performing the binary search on the logical block addresses across the range of logical block addresses extending from the lower bound to the upper bound may include detecting whether individual logical block addresses in the range of logical block addresses extending from the lower bound to the upper bound have been used to persistently store metadata.

In some embodiments, detecting whether individual logical block addresses in the range of logical block addresses extending from the lower bound to the upper bound have previously been used to store metadata may include performing read operations directed to individual logical block addresses in the range of logical block addresses to determine whether data returned in response to the read operations includes an indication of valid previously stored metadata.

In some embodiments, the logical unit is used to store metadata generated by at least one process executing in a storage processor of a data storage system. The process executing in the data storage system stores an identifier corresponding to the process in each block of metadata that is stored by the process into the logical unit. Detecting whether individual logical block addresses in the range of logical block addresses extending from the lower bound to the upper bound have previously been used to store metadata may include performing read operations directed to individual logical block addresses in the range of logical block addresses to determine whether data returned in response to the read operations includes the identifier corresponding to the process executing in the data storage system.

In some embodiments, determining the two RAID extents that were last allocated to the logical unit may include determining a total capacity of RAID extents previously allocated to the logical unit, determining a total number of RAID extents allocated to the logical unit by dividing the total capacity of RAID extents previously allocated to the logical unit by a RAID extent size, and determining the two RAID extents that were last allocated to the logical unit based on the total number of RAID extents allocated to the logical unit.

Embodiments of the disclosed technology may provide significant advantages over previous technical solutions. The disclosed technology improves the performance and availability of the data storage system in the event that the copy (or copies) of the last allocated logical block address for a metadata logical unit maintained by the storage processor becomes unavailable, by quickly recovering the last allocated logical block address for the logical unit in order to seamlessly continue processing of host I/O requests. The disclosed technology may recover the last allocated logical block address for a logical unit storing internally generated metadata without significant delays, thus potentially avoiding significant performance problems such as increased latency in servicing host I/O requests, and/or interruption to a storage service provided by the data storage system to the hosts, even when the total number of previously allocated logical block addresses for the logical unit becomes very large.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described with reference to the figures. The embodiments described herein are provided only as examples, in order to illustrate various features and principles of the disclosed technology, and the invention is broader than the specific embodiments described herein.

The technology disclosed herein may be embodied to provide improvements over previous technologies by recovering the location of the last previously allocated logical block address for a metadata logical unit by performing a binary search across the last two RAID extents that were previously allocated to the logical unit. In the disclosed technology, a logical unit of non-volatile data storage is provided for persistently storing metadata, by i) allocating RAID (Redundant Array of Independent Disks) extents to the logical unit, and ii) allocating logical block addresses for the logical unit from within a logical address space of the logical unit to store blocks of metadata written to the logical unit. When a stored indication (e.g. one or more persistently stored copies) of a last allocated logical block address for the logical unit has been lost (e.g. corrupted due to a hardware failure or software bug), the disclosed technology determines two RAID extents that were last allocated to the logical unit. The disclosed technology then performs a binary search across logical block addresses within the two RAID extents that were last allocated to the logical unit to locate the last allocated logical block address for the logical unit within the logical address space of the logical unit. The two RAID extents that were last allocated to the logical unit may include a second to last RAID extent allocated to the logical unit and a last RAID extent allocated to the logical unit. The binary search performed across the logical block addresses within the two RAID extents that were last allocated to the logical unit may be performed by i) initially setting a lower bound to a lowest logical block address within the second to last RAID extent allocated to the logical unit, ii) setting an upper bound to a highest logical block address within the last RAID extent allocated to the logical unit, and iii) performing the binary search on logical block addresses across a range of logical block addresses extending from the lower bound to the upper bound. The binary search performed across the logical block addresses within the range of logical block addresses extending from the lower bound to the upper bound may include detecting whether individual logical block addresses in that range of logical block addresses have previously been used by the storage processor to persistently store metadata generated by one or more processes executing within the storage processor.

Figure 1:
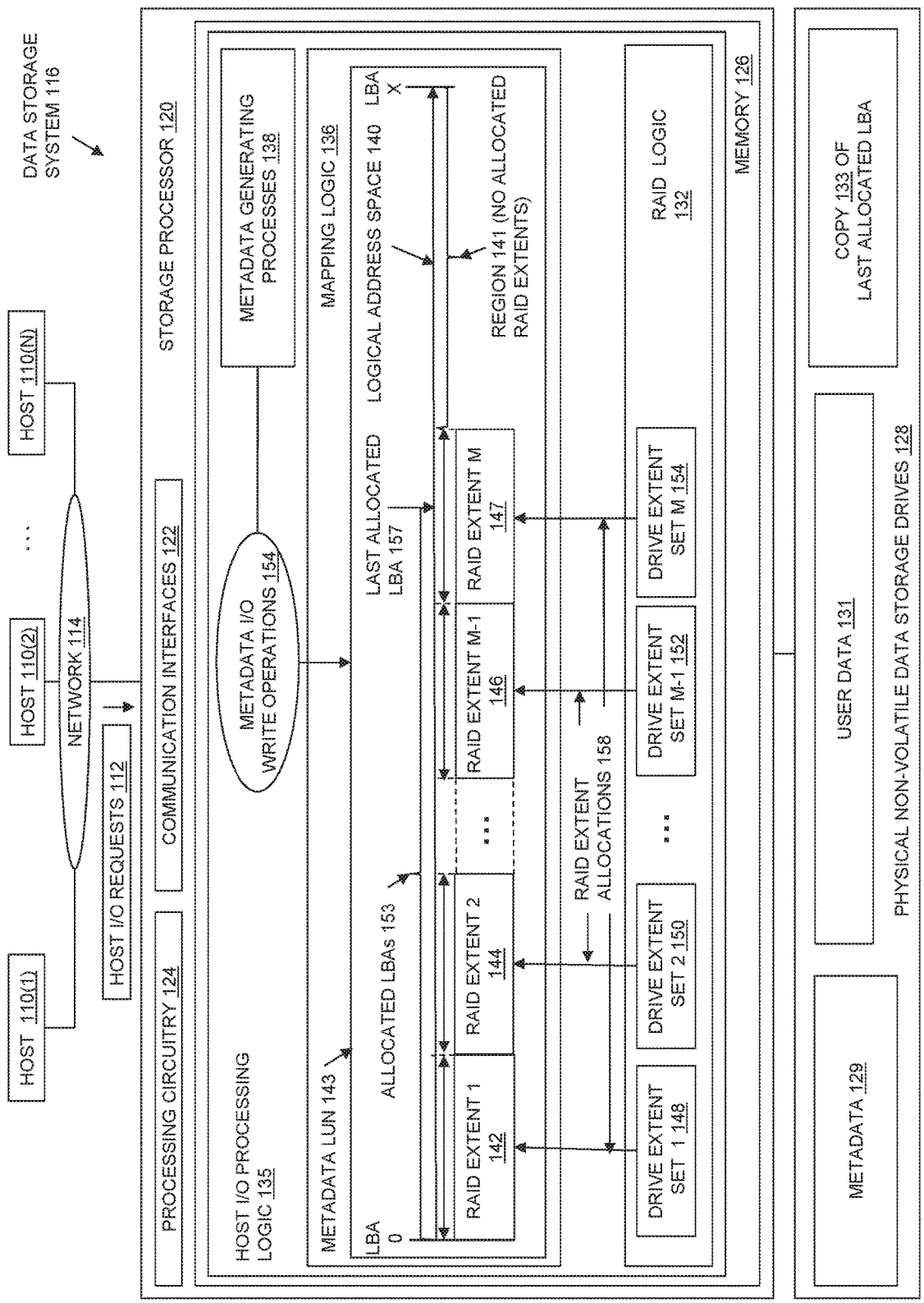
FIG. 1 is a block diagram showing an example of a data storage system in which an example of the disclosed technology is embodied.

FIG. 1 is a block diagram showing an operational environment for the disclosed technology, including an example of a data storage system in which the disclosed technology is embodied. FIG. 1 includes some number of physical and/or virtual Host Computing Devices 110, referred to as "hosts" and shown for purposes of illustration by Hosts 110(1) through 110(N). The hosts access data storage provided by Data Storage System 116, for example over one or more networks, such as a local area network (LAN), and/or a wide area network (WAN) such as the Internet, etc., and shown for purposes of illustration in FIG. 1 by Network 114. Data Storage System 116 includes at least one Storage Processor 120 that is communicably coupled to Network 114 and Physical Non-Volatile Data Storage Drives 128, e.g. though one or more Communication Interfaces 122. No particular hardware configuration is required, and Storage Processor 120 may be embodied as any specific type of device that is capable of processing host input/output (I/O) requests received from Hosts 110 (e.g. I/O read and I/O write requests, etc.) and persistently storing data.

The Physical Non-Volatile Data Storage Drives 128 may include physical data storage drives such as solid state drives, magnetic disk drives, hybrid drives, optical drives, and/or other specific types of drives. Physical Non-Volatile Data Storage Drives 128 may be directly physically connected to and/or contained within Storage Processor 120, and/or may be communicably connected to Storage Processor 120 by way of one or more networks.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, Memory 126 may include software components such as Host I/O Processing Logic 135. When program code in Memory 126 is executed by Processing Circuitry 124, Processing Circuitry 124 is caused to carry out the operations of the software components. Although certain software components are shown in the Figures and described herein for purposes of illustration and explanation, those skilled in the art will recognize that Memory 126 may include various other software components, such as an operating system, various applications, other specific processes, etc.

During operation, in order to provide mapped RAID data protection, RAID Logic 132 divides each one of the physical non-volatile data storage drives in Physical Non-Volatile Data Storage Drives 128 into multiple, equal size drive extents. Each drive extent consists of physically contiguous non-volatile data storage located on a single drive. For example, RAID Logic 132 may divide each one of the physical non-volatile data storage drives in Physical Non-Volatile Data Storage Drives 128 into the same fixed number of equal size drive extents of physically contiguous non-volatile storage. The size of the drive extents into which the physical non-volatile data storage drives in the Physical Non-Volatile Data Storage Drives 128 are divided may, for example, be the same for every physical non-volatile data storage drive in Physical Non-Volatile Data Storage Drives 128. Various specific sizes of drive extents may be used in different embodiments. For example, in some embodiments each drive extent may have a size of 10 gigabytes. Larger or smaller drive extent sizes may be used in the alternative. Any specific number of physical non-volatile data storage drives may be contained in the Physical Non-Volatile Data Storage Drives 128 and divided into equal size drive extents by RAID Logic 132.

RAID Logic 132 organizes the drive extents created in Physical Non-Volatile Data Storage Drives 128 into discrete sets of multiple drive extents, shown for purposes of illustration by Drive Extent Set 1 148, Drive Extent Set 2 150, and so on through Drive Extent Set M-1 152 and Drive Extent Set M 154. Each drive extent may be contained within only one set of drive extents. Each drive extent within any one of the sets of drive extents is located on a different physical non-volatile data storage drive within Physical Non-Volatile Data Storage Drives 128 from the other drive extents in the set, in order to ensure correct RAID operation.

Each set of drive extents is mapped by RAID Logic 132 (e.g. using mapping data structures in RAID Logic 132 such as one or more mapping tables or some other type of mapping data structures) to a single corresponding logical RAID extent, and is used by RAID Logic 132 to store metadata that is written to the logical block addresses contained in that RAID extent. For example, in the example of FIG. 1, Drive Extent Set 1 148 is mapped to RAID Extent 1 142, Drive Extent Set 2 150 is mapped to RAID Extent 2 144, and so on, through Drive Extent Set M-1 152, which is mapped to RAID Extent M-1 146, and Drive Extent Set M 154, which is mapped to RAID Extent M 147.

RAID extents are allocated by RAID Logic 132 to Metadata LUN 143, as shown in the example of FIG. 1 by RAID Extent Allocations 158. For example, new RAID extents may be allocated by RAID logic 132 to Metadata LUN 143 as the total amount of metadata written to Metadata LUN 143 increases. In some embodiments, a new RAID extent may be allocated to Metadata LUN 143 in response to RAID Logic 132 and/or Mapping Logic 136 detecting that an amount of unallocated logical block addresses within the last RAID extent allocated to Metadata LUN 143 is less than a minimum threshold number of unallocated logical block addresses. For example, in some embodiments, a new RAID extent may be allocated to Metadata LUN 143 in response to detecting that the amount of unallocated logical block addresses within the last RAID extent allocated to Metadata LUN 143 indicates that less than one gigabyte of free capacity is available within that RAID extent. In the example of FIG. 1, a total number of M RAID extents have been allocated to Metadata LUN 143. A corresponding level of RAID protection is separately and independently provided by each one of the RAID extents allocated to Metadata LUN 143.

Each one of the RAID extents allocated to Metadata LUN 143 provides non-volatile data storage for storing metadata written to logical block addresses contained within that RAID extent, and forms a logically contiguous address region of logical block addresses within the Logical Address Space 140 of Metadata LUN 143. Logical Address Space 140 consists of logical block addresses that extend upward from logical block address 0 to some largest possible logical block address X. For example, metadata written to logical block addresses within RAID Extent 1 142 may be striped across the drive extents in Drive Extent Set 1 148, metadata written to logical block addresses within RAID Extent 2 144 may be striped across the drive extents in Drive Extent Set 2 150, and so on, with metadata written to logical block addresses within RAID Extent M-1 146 being striped across the drive extents in Drive Extent Set M-1 152, and metadata written to logical block addresses within RAID Extent M 147 being striped across the drive extents in Drive Extent Set M 154.

In the example of FIG. 1, the total number of logical block addresses in Logical Block Address Space 140 is greater than the total number of logical block addresses in the RAID extents allocated to Metadata LUN 142 (e.g. in RAID Extent 1 142 through RAID Extent M 147), and accordingly Logical Block Address Space 140 also includes a Region 141 for which no RAID extents have yet been allocated.

While Host I/O Processing Logic 135 processes Host I/O Requests 112, and stores user data indicated by write requests in Host I/O Requests 112 into Physical Non-Volatile Data Storage Drives 128 (e.g. as shown by User Data 131), one or more processes within Host I/O Processing Logic 135 generate metadata related to the stored user data, e.g. Metadata Generating Processes 138. Examples of metadata that may be generated by Metadata Generating Processes 138 while Host I/O Processing Logic 135 processes Host I/O Requests 112 include, without limitation, metadata describing and/or representing mappings from logical addresses within user data storage objects hosted by Data Storage System 116 and accessed by Hosts 110 (e.g. logical block addresses within user data LUNs, offsets into user data files, etc.) to physical locations within Physical Non-Volatile Data Storage Drives 128, metadata describing and/or representing point in time copies of user data storage objects generated by Storage Processor 120 and sometimes referred to as "snapshots", and/or other specific types of metadata generated by Metadata Generating Processes 138 while Host I/O Processing Logic 135 processes Host I/O Requests 112.

When one or more of Metadata Generating Processes 138 need to persistently store any portion of the metadata that they generate to Physical Non-Volatile Data Storage Drives 128, they issue Metadata I/O Write Operations 154 that write blocks of that metadata to Metadata LUN 143. Mapping Logic 136 receives and processes Metadata I/O Write Operations 154 at least in part by allocating logical block addresses from Logical Address Space 140 that are then used to persistently store the blocks of metadata as part of Metadata LUN 143, e.g. within Metadata 129. The logical block addresses previously allocated by Mapping Logic 136 from Logical Address Space 140 to store metadata written to Metadata LUN 143 are shown for purposes of illustration in the example of FIG. 1 by Allocated LBAs 153, and a last allocated logical block address within Allocated LBAs 153 is shown by Last Allocated LBA 157.

As each metadata I/O write operation directed to Metadata LUN 143 is received by Mapping Logic 136, Mapping Logic 136 allocates a number of logical block addresses from Logical Address Space 140 to store the blocks of metadata indicated by the metadata I/O write operation that is equal to the number of blocks metadata indicated by the metadata I/O write operation. Mapping Logic 136 only allocates logical block addresses from regions of the Logical Address Space 140 that correspond to RAID extents previously allocated to Metadata LUN 143. As blocks of metadata are written to Metadata LUN 143, Logical block addresses are allocated from Logical Address Space 140 contiguously upwards within Logical Address Space 140, e.g. starting with logical block address 0. After a set of one or more logical block addresses are allocated by Mapping Logic 136 from Logical Address Space 140 to store one or more blocks of metadata indicated by a metadata I/O write operation directed to Metadata LUN 143, Mapping Logic 136 persistently stores an indication of the last allocated logical block address, i.e. at least one copy the highest logical block address that has been allocated so far from Logical Address Space 140 to store blocks of metadata written to Metadata LUN 143. In the example of FIG. 1, Mapping Logic 136 has previously allocated all the logical block addresses within Allocated LBAs 153 to store blocks of Metadata LUN 143 written to Metadata LUN 143. Accordingly, the last allocated logical block address is the highest logical block address within Allocated LBAs 153, e.g. Last Allocated LBA 157. Mapping Logic 136 persistently stores a copy of Last Allocated LBA 157, e.g. into Physical Non-Volatile Data Storage Drives 128, as shown for purposes of illustration by Copy 133 of Last Allocated LBA.

Mapping Logic 136 may subsequently need to determine Last Allocated LBA 157, e.g. by retrieving Copy 133 of Last Allocated LBA, in order to determine where to resume allocating logical block addresses within Logical Address Space 140 to be used to store blocks of metadata indicated by subsequently received metadata write I/O operations directed to Metadata LUN 143. However, various circumstances may cause Copy 133 of Last Allocated LBA to become lost. For example, Copy 133 of Last Allocated LBA may become corrupted due to a hardware failure, a software bug, etc. Under such circumstances, Mapping Logic 136 must recover Last Allocated LBA 157 without Copy 133 of Last Allocated LBA.

In response to detecting that Copy 133 of Last Allocated LBA has been lost, Mapping Logic 136 determines the two RAID extents that were last allocated to Metadata LUN 143. In the example of FIG. 1, Mapping Logic 133 identifies RAID Extent M-1 146 and RAID Extent M 147 as the two RAID extents that were last allocated to Metadata LUN 143. Mapping Logic 136 then performs a binary search across the logical block addresses that are located within the two RAID extents that were last allocated to Metadata LUN 143 in order to locate Last Allocated LBA 157 for Metadata LUN 143 within the Logical Address Space 140 of Metadata LUN 143. In the example of FIG. 1, Mapping Logic 133 performs a binary search across the logical block addresses that are located within RAID Extent M-1 147 and RAID Extent M 147 in order to locate Last Allocated LBA 157.

The two RAID extents that were last allocated to Metadata LUN 143 may consist of a second to last RAID extent allocated to Metadata LUN 143 (e.g. RAID Extent M-1 146), and a last RAID extent allocated to Metadata LUN 143 (e.g. RAID Extent M 147). Mapping Logic 136 may perform the binary search to locate Last Allocated LBA 157 across the logical block addresses within RAID Extent M-1 146 and RAID Extent M 147 by initially setting a lower bound to a lowest logical block address within RAID Extent M-1 146, initially setting an upper bound to a highest logical block address within RAID Extent M 147, and then performing the binary search on logical block addresses across the range of logical block addresses that extends from the lower bound to the upper bound.

Mapping Logic 136 may perform the binary search across the range of logical block addresses extending from the lower bound to the upper bound at least in part by detecting whether selected individual logical block addresses in the range of logical block addresses extending from the lower bound to the upper bound have previously been used to persistently store metadata. For example, Mapping Logic 136 may detect whether individual logical block addresses in the range of logical block addresses extending from the lower bound to the upper bound have previously been used to store metadata by performing read operations directed to selected individual logical block addresses within the range of logical block addresses, in order to determine whether the data returned in response to such read operations includes an indication of valid previously stored metadata.

In some embodiments, each process in Metadata Generating Processes 138 may be assigned a corresponding unique identifier that it stores at a predetermined location within each block of metadata that it generates and persistently stores to Metadata LUN 143. For example, each process in Metadata Generating Processes 138 may store its unique identifier at the beginning of each block of metadata that it generates and persistently stores. In such embodiments, Mapping Logic 136 may be aware of the identifiers that are assigned to the individual processes in Metadata Generating Processes 138. Accordingly, Mapping Logic 136 may detect whether individual logical block addresses in the range of logical block addresses extending from the lower bound to the upper bound have previously been used to store metadata at least in part by performing read operations directed to selected individual logical block addresses in the range of logical block addresses by determining whether the data returned in response to the read operations includes a valid one of the unique identifiers corresponding to the processes in Metadata Generating Processes 138.

In some embodiments, Mapping Logic 136 may determine the two RAID extents that were last allocated to Metadata LUN 143 by first determining a total capacity of all the RAID extents that have previously been allocated to Metadata LUN 143. Such a total capacity of previously allocated RAID extents may, for example, be obtained from RAID Logic 132. Mapping Logic 136 may then determine a total number of RAID extents previously allocated to Metadata LUN 143 by dividing the total capacity of all the RAID extents previously allocated to Metadata LUN 143 by the size of each individual RAID extent. Various specific RAID extent sizes may be used, and the disclosed technology is not limited to any specific RAID extent size. For example, in an embodiment or configuration in which the size of each RAID extent is 10 gigabytes, and in the case where the Mapping Logic 136 determines that the total capacity of the RAID extents previously allocated to Metadata LUN 143 is 80 gigabytes, Mapping Logic 136 may determine that 8 RAID extents have previously been allocated to Metadata LUN 143. Mapping Logic 136 may then determine that the two RAID extents that were last allocated to Metadata LUN 143 are the two previously allocated RAID extents that contain the logical block addresses extending across gigabytes 60-79 within the Logical Address Space 140 (e.g. with gigabyte numbering starting with gigabyte 0), thus identifying, for example, RAID Extent M-1 146 and RAID Extent M 147.

Figure 2:
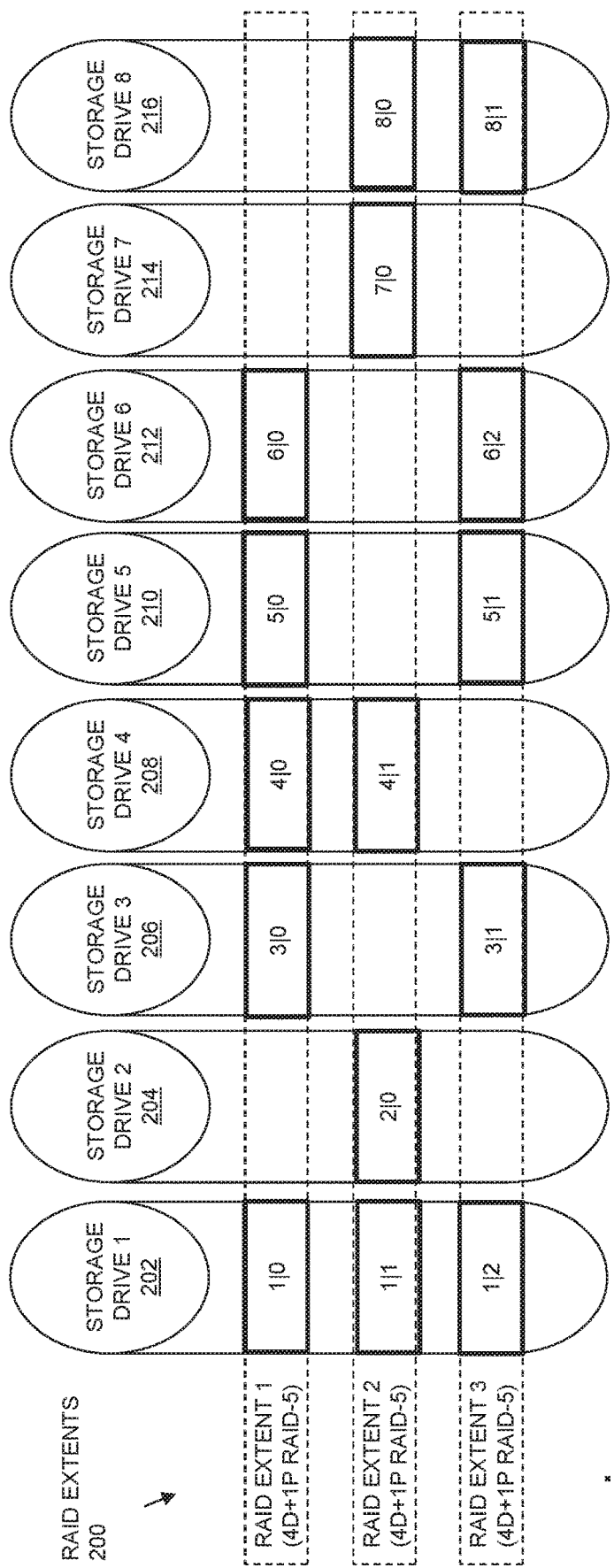
FIG. 2 is a block diagram showing an example of RAID extents in some embodiments.

FIG. 2 is a block diagram showing an example of sets of drive extents mapped to individual RAID extents within the RAID extents that are allocated to a metadata LUN. In the example of FIG. 2, RAID Extents 200 include a RAID Extent 1, RAID Extent 2, and RAID Extent 3, and some number of other RAID extents. Each of the RAID extents in RAID Extents 200 provide the same level of RAID protection, e.g. 4D+1P RAID-5 level RAID protection. Other RAID levels may be provided in the alternative. Further in the example of FIG. 2, for purposes of concise illustration the drive extents are mapped to the RAID extents from eight non-volatile data storage drives, shown by Storage Drive 1 202, Storage Drive 2 204, Storage Drive 3 206, Storage Drive 4 208, Storage Drive 5 210, Storage Drive 6 212, Storage Drive 7 214, and Storage Drive 8 216. Any specific number of non-volatile data storage drives may be used in the alternative. In order to provide 4D+1P RAID-5 level RAID protection, each RAID extent is mapped to a set of five drive extents.

For example, RAID Extent 1 is mapped to a set of five drive extents including a first drive extent 1|0, which is the first drive extent in Storage Drive 1 202, a second drive extent 3|0, which is the first drive extent in Storage Drive 3 206, a third drive extent 4|0, which is the first drive extent in Storage Drive 4 208, a fourth drive extent 5|0, which is the first drive extent in Storage Drive 5 210, and a fifth drive extent 6|0, which is the first drive extent in Storage Drive 6 212.

RAID Extent 2 is mapped to a set of five drive extents including a first drive extent 1|1, which is the second drive extent in Storage Drive 1 202, a second drive extent 2|0, which is the first drive extent in Storage Drive 2 204, a third drive extent 4|1, which is the second drive extent in Storage Drive 4 208, a fourth drive extent 7|0, which is the first drive extent in Storage Drive 7 214, and a fifth drive extent 8|0, which is the first drive extent in Storage Drive 8 216.

RAID Extent 3 is mapped to a set of five drive extents including a first drive extent 1|2, which is the third drive extent in Storage Drive 1202, a second drive extent 3||, which is the second drive extent in Storage Drive 3 206, a third drive extent 5|1, which is the second drive extent in Storage Drive 5 210, a fourth drive extent 6|2, which is the third drive extent in Storage Drive 6 212, and a fifth drive extent 8|1, which is the second drive extent in Storage Drive 8 216.

Figure 3:
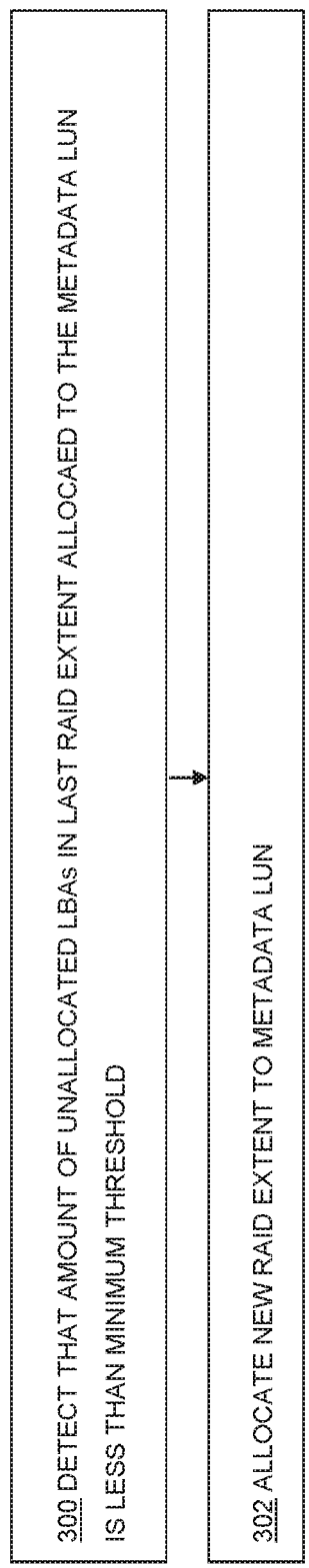
FIG. 3 is a flow chart illustrating steps that may be performed to allocate RAID extents to a logical unit in some embodiments.

FIG. 3 is a flow chart illustrating steps that may be performed to allocate RAID extents to a logical unit of non-volatile data storage that is used to persistently store metadata (a "metadata LUN"). As shown in FIG. 3, at step 300 the disclosed technology detects that a total amount (e.g. a total number) of unallocated logical block addresses within a last RAID extent that was allocated to the metadata LUN is less than a minimum threshold amount (e.g. minimum number) of unallocated logical block addresses. At step 302, in response to detecting at step 300 that the total amount of unallocated logical block addresses within the last RAID extent that was allocated to the metadata LUN is less than the minimum threshold amount of unallocated logical block addresses, the disclosed technology allocates a new RAID extent to the metadata LUN.

Figure 4:
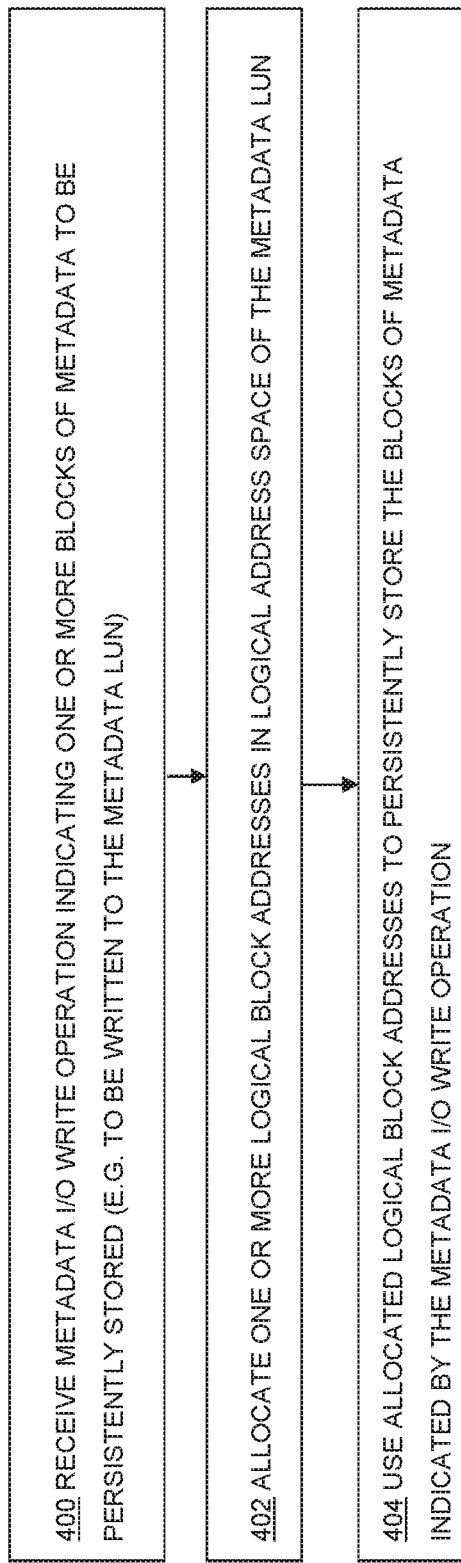
FIG. 4 is a flow chart illustrating steps that may be performed in some embodiments to allocate logical block addresses from a logical address space of a logical unit.

FIG. 4 is a flow chart illustrating steps that may be performed in some embodiments to allocate logical block addresses from a logical address space of a logical unit of non-volatile data storage that is used to persistently store metadata (a "metadata LUN"). As shown in FIG. 4, at step 400 a metadata I/O write operation is received directed to a metadata LUN. The metadata I/O write operation received at step 400 indicates some number of blocks of metadata that are to be written to the metadata LUN so that the blocks of metadata are persistently stored in non-volatile data storage that is mapped to the metadata LUN. At step 402, in response to receipt of the metadata I/O write operation at step 400, a number of logical block addresses for the metadata LUN are allocated from within a logical address space of the metadata LUN, to be used to store blocks of metadata indicated by the metadata I/O write operation. The number of logical block addresses allocated at step 402 is the same as the number of blocks of metadata indicated by the metadata I/O write operations received at step 400. At step 404 the logical block addresses allocated at step 402 are used to persistently store the blocks of metadata indicated by the metadata I/O write operation, by writing those blocks of metadata to the metadata LUN using the logical block addresses allocated at step 402.

Figure 5:
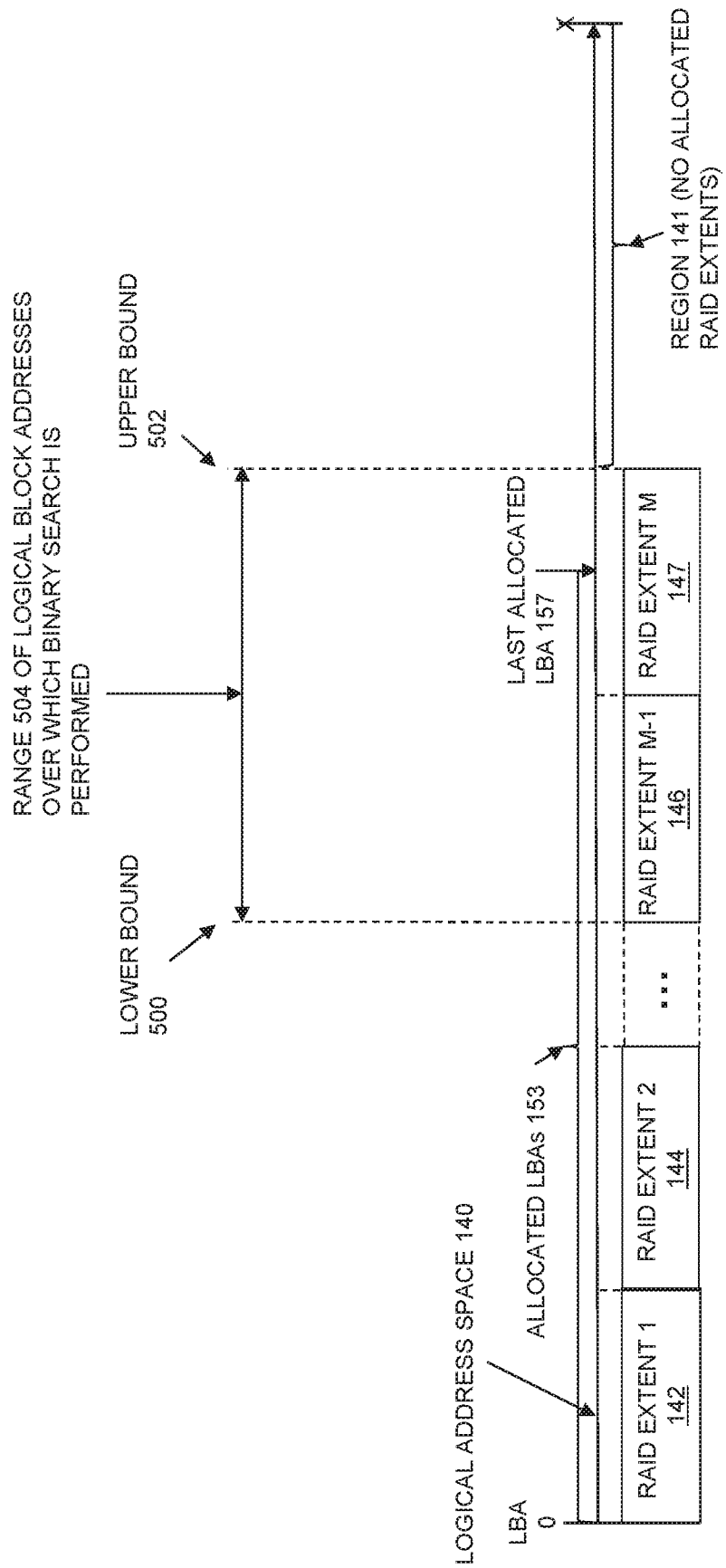
FIG. 5 is a block diagram illustrating an example of a range of logical block addresses over which a binary search is performed to locate a last allocated logical block address in some embodiments.

FIG. 5 is a block diagram showing an example of a range of logical block addresses over which a binary search is performed by the disclosed technology in order to locate a last allocated logical block address in some embodiments, e.g. in response to detecting that a persistently stored copy of the last allocated logical block address has been lost.

As shown in FIG. 5, the Range 504 over which the binary search is performed extends over all the logical block addresses within the last two RAID extents allocated to the metadata LUN, e.g. all the logical block addresses within RAID Extent M-1 146 and RAID Extent M 147. Further in the example of FIG. 5, a Lower Bound 500 of the Range 504 is shown initially set to the lowest logical block address in RAID Extent M-1 146 (the second to last RAID extent allocated to the metadata LUN), and an Upper Bound 502 of the Range 504 is shown initially set to the highest logical block address in RAID Extent M 147 (the last RAID extent allocated to the metadata LUN).

Figure 6:
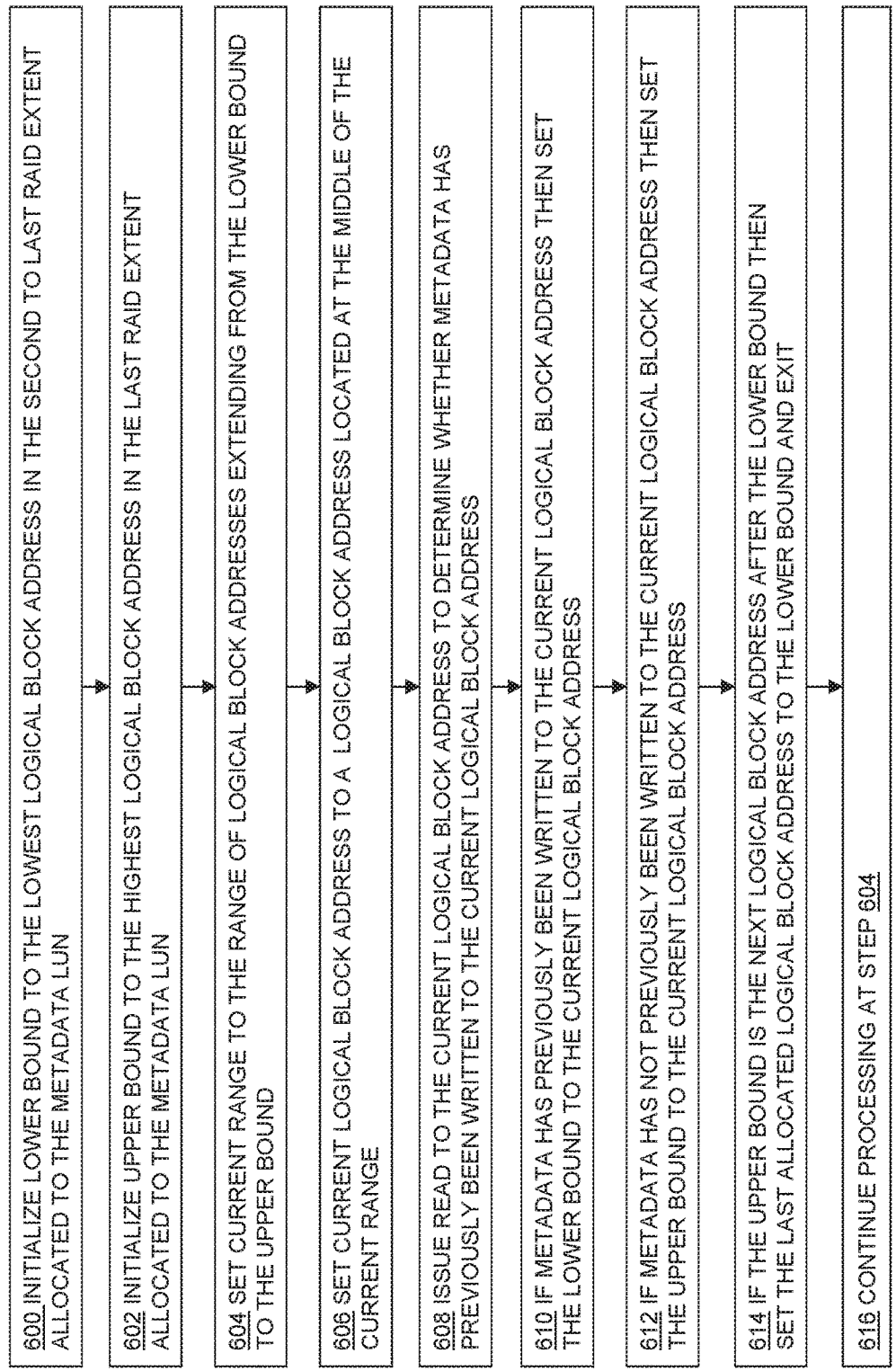
FIG. 6 is a flow chart illustrating steps of a binary search performed in some environments.

FIG. 6 is a flow chart illustrating steps of performing a binary search across the logical block addresses within the two RAID extents that were last allocated to a metadata logical unit to locate the last allocated logical block address for the metadata logical unit (LUN) within the logical address space of the metadata logical unit in some environments.

At step 600, a lower bound is initialized to the lowest logical block address in the second to last RAID extent allocated to the metadata logical unit.

At step 602, an upper bound is initialized to the highest logical block address in the last RAID extent allocated to the metadata logical unit.

At step 604, a current range of logical block addresses is set to the range of logical block addresses extending from the lower bound to the upper bound.

At step 606, a current logical block address is set to a logical block address located at the middle of the current range of logical block addresses. For example, at step 606 the current logical block address may be set to a logical block address is equidistant from the lower bound and the upper bound, e.g. for a current range extending from a lower bound of logical block address 10 through an upper bound of logical block address 16, the current logical block address may be set to logical block address 13, which is equidistant from logical block address 10 and logical block address 16. In another example, at step 606 the current logical block address may be set to one of the logical block addresses in a set of two logical block addresses that is equidistant from the lower bound and the upper bound. For example, for a current range extending from a lower bound of logical block address 9 through an upper bound of logical block address 16, the set of logical block addresses 12 and 13 is equidistant from logical block address 9 and logical block address 16, and the current logical block address may be set to either logical block address 12 or logical block address 13.

At step 608, a read operation is issued to the metadata logical unit that is directed to the current logical block address. A determination is made based on the block of data returned from the read operation as to whether metadata has previously been written to the current logical block address. For example, the block of data returned may be checked to determine whether the block of data contains an indication that metadata has previously been written to the current logical block address. Such an indication may, for example, consist of or include an identifier corresponding to a metadata generating process that is stored at a predetermined location within the returned block of data.

At step 610, if metadata has previously been written to the current logical block address, then the lower bound is set to the current logical block address.

At step 612, if metadata has not previously been written to the current logical block address, then the upper bound is set to the current logical block address.

At step 614, if the upper bound is now the next logical block address after the lower bound, then the lower bound is the last allocated logical block address. Accordingly, the last allocated logical block address is set to the lower bound, e.g. the lower bound is persistently stored as a copy of the last allocated logical block address (e.g. in at least one copy of the last allocated logical block address stored in non-volatile data storage), and the binary search terminates.

Otherwise, if the upper bound is not the next logical block address after the lower bound, then the binary search continues by returning to step 604.

Figure 7:
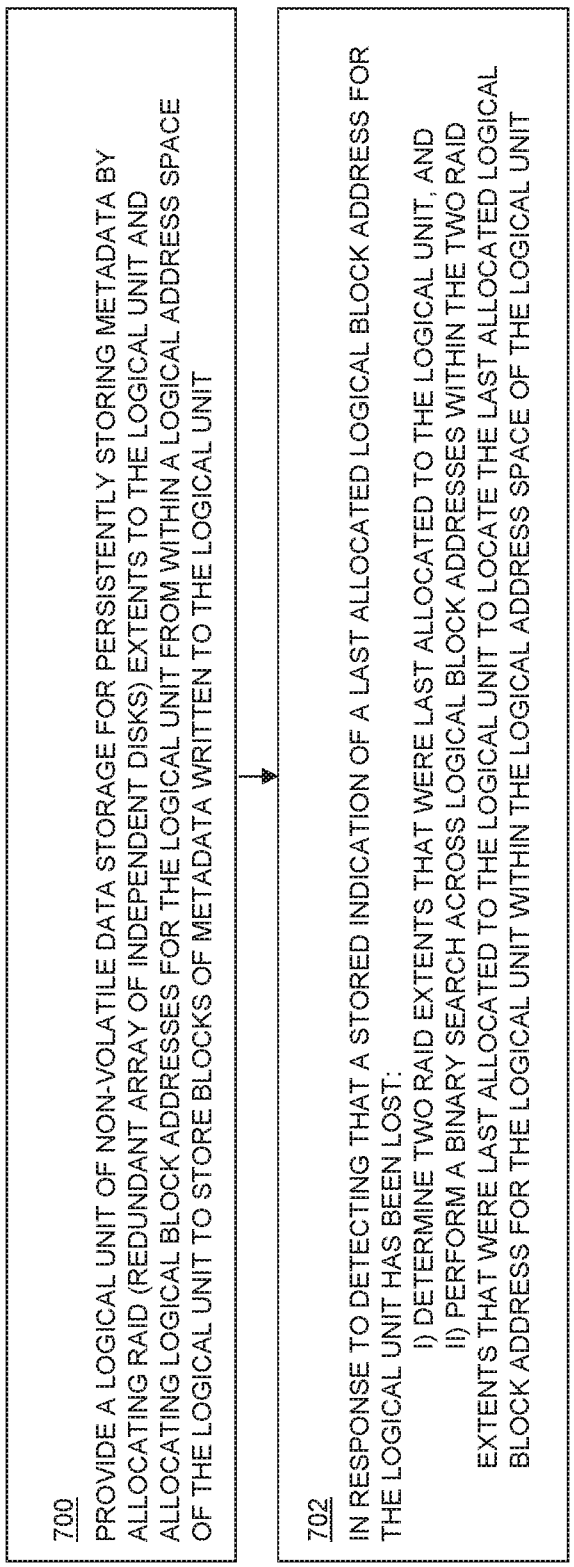
FIG. 7 is a flow chart showing steps that may be performed during operation of some embodiments.

FIG. 7 is a flow chart showing steps that may be performed during operation of some embodiments.

At step 700, a logical unit of non-volatile data storage is provided for persistently storing metadata by i) allocating RAID (Redundant Array of Independent Disks) extents to the logical unit, and ii) allocating logical block addresses for the logical unit from within a logical address space of the logical unit to store blocks of metadata written to the logical unit.

At step 702, in response to detecting that a stored indication of a last allocated logical block address for the logical unit has been lost, the disclosed technology i) determines the two RAID extents that were last allocated to the logical unit, and ii) performs a binary search across logical block addresses within the two RAID extents that were last allocated to the logical unit to locate the last allocated logical block address for the logical unit within the logical address space of the logical unit.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
    providing a logical unit of non-volatile data storage for persistently storing metadata by allocating RAID (Redundant Array of Independent Disks) extents to the logical unit and allocating logical block addresses for the logical unit from within a logical address space of the logical unit to store blocks of metadata written to the logical unit; and
    in response to detecting that a stored indication of a last allocated logical block address for the logical unit has been lost:
        determining two RAID extents that were last allocated to the logical unit, and
        performing a binary search across logical block addresses within the two RAID extents that were last allocated to the logical unit to locate the last allocated logical block address for the logical unit within the logical address space of the logical unit.

2. The method of claim 1, wherein the two RAID extents that were last allocated to the logical unit comprise a second to last RAID extent allocated to the logical unit and a last RAID extent allocated to the logical unit, and wherein performing the binary search across the logical block addresses within the two RAID extents that were last allocated to the logical unit comprises:
    initially setting a lower bound to a lowest logical block address within the second to last RAID extent allocated to the logical unit;
    initially setting an upper bound to a highest logical block address within the last RAID extent allocated to the logical unit; and
    performing the binary search on logical block addresses across a range of logical block addresses extending from the lower bound to the upper bound.

3. The method of claim 2, wherein performing the binary search on the logical block addresses across the range of logical block addresses extending from the lower bound to the upper bound includes detecting whether individual logical block addresses in the range of logical block addresses extending from the lower bound to the upper bound have been used to persistently store metadata.

4. The method of claim 3, wherein detecting whether individual logical block addresses in the range of logical block addresses extending from the lower bound to the upper bound have previously been used to store metadata includes performing read operations directed to individual logical block addresses in the range of logical block addresses to determine whether data returned in response to the read operations includes an indication of valid previously stored metadata.

5. The method of claim 4, wherein the logical unit is used to store metadata generated by at least one process executing in a storage processor of a data storage system;
    wherein the process executing in the data storage system stores an identifier corresponding to the process in each block of metadata that is stored by the process into the logical unit; and
    wherein detecting whether individual logical block addresses in the range of logical block addresses extending from the lower bound to the upper bound have previously been used to store metadata includes performing read operations directed to individual logical block addresses in the range of logical block addresses to determine whether data returned in response to the read operations includes the identifier corresponding to the process executing in the data storage system.

6. The method of claim 1, wherein determining the two RAID extents that were last allocated to the logical unit comprises:
    determining a total capacity of RAID extents previously allocated to the logical unit;
    determining a total number of RAID extents allocated to the logical unit by dividing the total capacity of RAID extents previously allocated to the logical unit by a RAID extent size; and
    determining the two RAID extents that were last allocated to the logical unit based on the total number of RAID extents allocated to the logical unit.

7. A data storage system comprising:
    at least one storage processor including processing circuitry and a memory;
    a plurality of non-volatile data storage drives communicably coupled to the storage processor; and
    wherein the memory has program code stored thereon, wherein the program code, when executed by the processing circuitry, causes the processing circuitry to:
        provide a logical unit of non-volatile data storage for persistently storing metadata by allocating RAID (Redundant Array of Independent Disks) extents to the logical unit and allocating logical block addresses for the logical unit from within a logical address space of the logical unit to store blocks of metadata written to the logical unit; and
        in response to detecting that a stored indication of a last allocated logical block address for the logical unit has been lost:
            determine two RAID extents that were last allocated to the logical unit, and
            perform a binary search across logical block addresses within the two RAID extents that were last allocated to the logical unit to locate the last allocated logical block address for the logical unit within the logical address space of the logical unit.

8. The data storage system of claim 7, wherein the two RAID extents that were last allocated to the logical unit comprise a second to last RAID extent allocated to the logical unit and a last RAID extent allocated to the logical unit, and wherein the program code, when executed by the processing circuitry, causes the processing circuitry to perform the binary search across the logical block addresses within the two RAID extents that were last allocated to the logical unit at least in part by causing the processing circuitry to:

initially set a lower bound to a lowest logical block address within the second to last RAID extent allocated to the logical unit;

initially set an upper bound to a highest logical block address within the last RAID extent allocated to the logical unit; and perform the binary search on logical block addresses across a range of logical block addresses extending from the lower bound to the upper bound.

9. The data storage system of claim 8, wherein the program code, when executed by the processing circuitry, causes the processing circuitry to perform the binary search on the logical block addresses across the range of logical block addresses extending from the lower bound to the upper bound at least in part by causing the processing circuitry to detect whether individual logical block addresses in the range of logical block addresses extending from the lower bound to the upper bound have been used to persistently store metadata.

10. The data storage system of claim 9, wherein the program code, when executed by the processing circuitry, causes the processing circuitry to detect whether individual logical block addresses in the range of logical block addresses extending from the lower bound to the upper bound have previously been used to store metadata at least in part by causing the processing circuitry to perform read operations directed to individual logical block addresses in the range of logical block addresses to determine whether data returned in response to the read operations includes an indication of valid previously stored metadata.

11. The data storage system of claim 10, wherein the logical unit is used to store metadata generated by at least one process executing in a storage processor of a data storage system;

wherein the process executing in the data storage system stores an identifier corresponding to the process in each block of metadata that is stored by the process into the logical unit; and wherein the program code, when executed by the processing circuitry, causes the processing circuitry to detect whether individual logical block addresses in the range of logical block addresses extending from the lower bound to the upper bound have previously been used to store metadata at least in part by causing the processing circuitry to perform read operations directed to individual logical block addresses in the range of logical block addresses to determine whether data returned in response to the read operations includes the identifier corresponding to the process executing in the data storage system.

12. The data storage system of claim 7, wherein the program code, when executed by the processing circuitry, causes the processing circuitry to determine the two RAID extents that were last allocated to the logical unit at least in part by causing the processing circuitry to:

determine a total capacity of RAID extents previously allocated to the logical unit;

determine a total number of RAID extents allocated to the logical unit by dividing the total capacity of RAID extents previously allocated to the logical unit by a RAID extent size; and determine the two RAID extents that were last allocated to the logical unit based on the total number of RAID extents allocated to the logical unit.

13. A computer program product including a non-transitory computer readable medium having instructions stored thereon, wherein the instructions, when executed on processing circuitry, cause the processing circuitry to perform the steps of:

providing a logical unit of non-volatile data storage for persistently storing metadata by allocating RAID (Redundant Array of Independent Disks) extents to the logical unit and allocating logical block addresses for the logical unit from within a logical address space of the logical unit to store blocks of metadata written to the logical unit; and in response to detecting that a stored indication of a last allocated logical block address for the logical unit has been lost:

determining two RAID extents that were last allocated to the logical unit, and performing a binary search across logical block addresses within the two RAID extents that were last allocated to the logical unit to locate the last allocated logical block address for the logical unit within the logical address space of the logical unit.

* * * * *